(12) United States Patent
Feng et al.

(10) Patent No.: US 7,565,046 B2
(45) Date of Patent: Jul. 21, 2009

(54) MODE TRANSFORMERS FOR LOW INDEX HIGH CONFINEMENT WAVEGUIDES

(75) Inventors: Ning-Ning Feng, Somerville, MA (US); Rong Sun, Cambridge, MA (US); Lionel C. Kimerling, Concord, MA (US); Jurgen Michel, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/954,461

(22) Filed: Dec. 12, 2007

(65) Prior Publication Data
US 2008/0152279 A1    Jun. 26, 2008

Related U.S. Application Data

(60) Provisional application No. 60/874,672, filed on Dec. 13, 2006.

(51) Int. Cl.
*G02B 6/26* (2006.01)
*G02B 6/42* (2006.01)

(52) U.S. Cl. .......................................... 385/28; 385/43
(58) Field of Classification Search ............... 385/28, 385/43
See application file for complete search history.

(56) References Cited

U.S. PATENT DOCUMENTS 6,697,551 B2 *   2/2004   Lee et al. ...................... 385/28
7,289,694 B2   10/2007   Hochberg et al.
2005/0135739 A1   6/2005   Kim et al.
2006/0228074 A1*  10/2006  Lipson et al. ................. 385/42

FOREIGN PATENT DOCUMENTS

DE        10236798       3/2004
JP       20060329680    12/2006
WO       2005111680     11/2005

OTHER PUBLICATIONS

Chen et al., "20 dB-enhanced coupling to slot photonic crystal waveguide using multimode interference coupler" Applied Physics Letters 91, 2007 American Institute of Physics, pp. 091111-1-091111-3.
Veronis et al., "Theoretical investigation of compact between dielectric slab waveguides and two-dimensional metal-dielectric-metal plasmonic waveguides" Optics Express, vol. 15, No. 3, pp. 1211-1221.
Chen et al., "Subwavelength confinement in an integrated metal slot waveguide on silicon" Optics Letters, vol. 31, No. 14, pp. 2133-2135.

* cited by examiner

*Primary Examiner*—Sung H Pak
*Assistant Examiner*—Daniel Petkovsek
(74) *Attorney, Agent, or Firm*—Gauthier & Connors LLP

(57) ABSTRACT

The mode transforming structure includes a first waveguide structure. A slot waveguide region is coupled to the first waveguide structure. The slot waveguide region includes one or more complementary tapered pairs so near lossless transforming between the first waveguide structure and the slot waveguide region occurs so as to allow optical modes to be transferred between the first waveguide and the slot waveguide region.

3 Claims, 9 Drawing Sheets

MODE TRANSFORMERS FOR LOW INDEX HIGH CONFINEMENT WAVEGUIDES

PRIORITY INFORMATION

This application claims priority from provisional application Ser. No. 60/874,672 filed Dec. 13, 2006, which is incorporated herein by reference in its entirety.

This invention was made with government support awarded by the Air Force Aerospace Research-OSR under Contract No. FA9550-60-1-0470. The government has certain rights in the invention.

BACKGROUND OF THE INVENTION

The invention relates to the field of optically confining structures, and in particular to mode transformers for low index high confinement waveguides.

Strong light confining, low loss propagating, and converting are the three fundamental issues for a miniaturized, high speed, and integrated light-wave circuit. The conventional light waveguiding approach is based on optical waveguides made of a high-index core surrounded by low-index claddings. The total internal reflection (TIR) at the core/cladding boundaries ensures most of the energy confined inside the core regions. High index contrast waveguides, such as silicon strip waveguides, have the benefit of strong confinement and low loss which satisfy the requirement of the planar photonic integration. However, the problems associated with mode conversion between high index contrast waveguides and low index contrast waveguides still remain.

In some other circumstances, such as in the photonic bandgap (PBG) structures and anti-resonant reflecting optical waveguides (ARROWs), by utilizing the external reflection induced by the multiple-dielectric-layer interferences, light can be confined and guided in the low-index core. To confine light inside the low index core regions, the resonant condition requires the core dimensions to be on the order of the wavelength.

Very recently, a novel structure named slot waveguide has been proposed and demonstrated the capability of guiding and confining light in low-index media in the nanometer size range. The structure consists of a single or multiple thin low-index slots (layers) embedded between high-index regions. Due to the large index contrast at interfaces, the normal electric field undergoes a large discontinuity, which results in a high field concentration in the low-index regions. Depending on applications, the structure can be vertical slots and horizontal layers, nevertheless, they are considered low index high confinement waveguides.

High index contrast waveguides, ARROR/PBG waveguides, and low index high confinement slot waveguides not only have different geometries but also show different physical properties. Geometrically, ARROW/PBG waveguides have the largest dimensions and mode sizes, therefore are suitable for fiber coupling. Slot waveguides, although of comparable dimensions and mode sizes to the high index contrast strip waveguides, have a large mode mismatching between them are quite big, which is indicated by the effective index difference. Obviously, low-loss mode transformers between waveguides are highly desired in order to realize multi-functional integrated photonic devices and circuits.

SUMMARY OF THE INVENTION

According to one aspect of the invention, there is provided a mode transforming structure. The structure includes a first waveguide structure. A slot waveguide region is coupled to the first waveguide structure. The slot waveguide region includes one or more complementary tapered pairs so near lossless transforming between the first waveguide structure and the slot waveguide region occurs so as to allow optical modes to be transferred between the first waveguide and the slot waveguide region.

According to another aspect of the invention, there is provided a method forming a mode transforming structure. The method includes providing a first waveguide structure. Also, the method includes forming a slot waveguide region being coupled to the first waveguide structure. The slot waveguide region includes one or more complementary tapered pairs so near lossless transforming between the first waveguide structure and the slot waveguide region occurs so as to allow optical modes to be transferred between the first waveguide and the slot waveguide region.

According to another aspect of the invention, there is provided a method of performing mode transformation. The method includes providing a first waveguide structure and coupling a slot waveguide region to the first waveguide structure. Also, the method includes arranging the slot waveguide region to have one or more complementary tapered pairs so near lossless transforming between the first waveguide structure and the slot waveguide region occurs so as to allow optical modes to be transferred between the first waveguide and the slot waveguide region.

DETAILED DESCRIPTION OF THE INVENTION

The invention proposes a new class of mode transformers based on the low index high confinement slot waveguide coupling structures using an index loading/weighting principle. These transformers enable optical fields to flow from high index contrast strip waveguides to slot waveguides, from slot waveguides to low index contrast waveguides, and from low index contrast waveguides to optical fiber; and the transformation processes are completely reversible going from optical fibers all the way to high index contrast strip waveguides. With these mode transformers, one can transfer optical modes between arbitrary waveguide types with very little loss.

Although slot waveguides and high index contrast strip waveguides have similar dimensions, the large field mismatching between the modes prevents them from transforming losslessly. The simplest design is based on the butt-joint transforming with a taper gradually changing the slot with from zero to the desired width. Unfortunately, this approach will not work because the field mismatching is so strong that it leads to large transforming loss. The invention describes a novel high-index-contrast-strip-waveguide-to-slot waveguide transformer by using complimentary taper pairs. The inventive configuration can realize virtually lossless transforming between these two waveguides.

Figure 1:
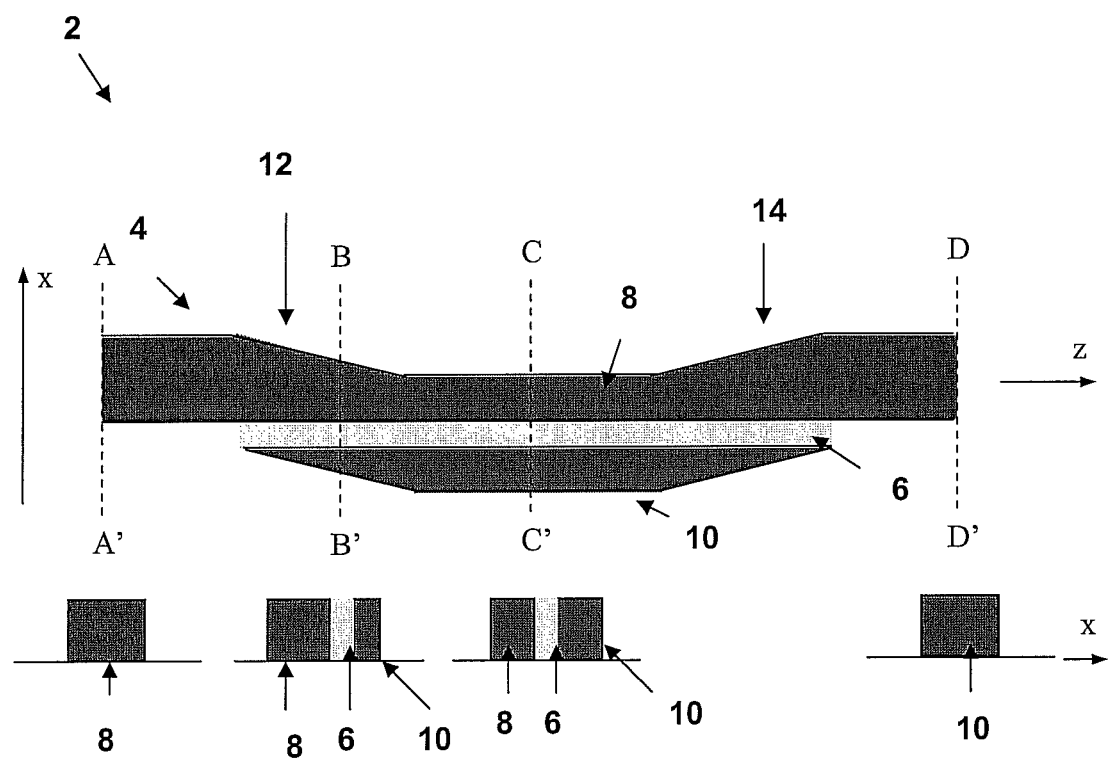
FIG. 1 is a schematic diagram of the top views and cross-sections of the proposed lossless high-index-contrast-strip-waveguide-to-slot-waveguide transformer with complimentary taper pairs.

A slot-waveguide-to-high-index-contrast-strip waveguide transformer 2 includes a single vertical slot waveguide 4 having a thin low index vertical material layers 6 embedded between two rectangular high index material layers 8, 10 as shown by the C-C' cut of FIG. 1. The mode transformer starts from a high index contrast strip waveguide being coupled to the mode transformer 2 with a cross-section shown by the A-A' cut. When it begins to transform, one side of the slot waveguide 4 gradually tapers down to the desired width for the high-index region 8. Simultaneously, a taper gradually increases its width to the desired width with the distance exactly equal to the slot width as shown by the cut D-D'. Through cuts B-B' and C-C', one can clearly understand the slow variation of the waveguide cross-section until it becomes the desired slot waveguide 4. Reversing the process, it is easy to obtain the counter part of the slot-waveguide-to-high-index-contrast-strip waveguide transformer 2.

The inventive transformer 2 utilizes the evanescent tail at the lower boundary of the high index contrast strip waveguide. Through a complementary taper pair 12, 14, it gradually increases the field intensity inside the slot region. Compared to the simple butt-joint taper configuration mentioned previously, where a strong field mismatching exists, the new structure 2 shows a slow field changing inside the slot waveguide 4. The structure 4 is expected to be lossless on the condition of the taper length is long enough. Although we show a linear taper here, the configuration will also include all the other tapers with different shapes, such as exponential or parabolic shapes.

Figure 2A:
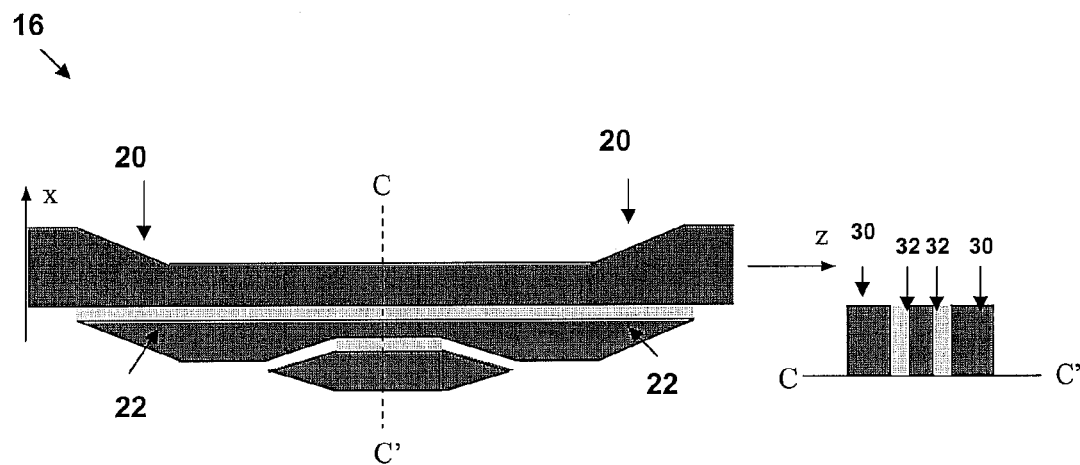
FIGS. 2A-2B are schematic diagrams for the top views and cross-sections of a high-index-contrast-strip-waveguide-to-multiple-slot-waveguide transformers.
Figure 2B:
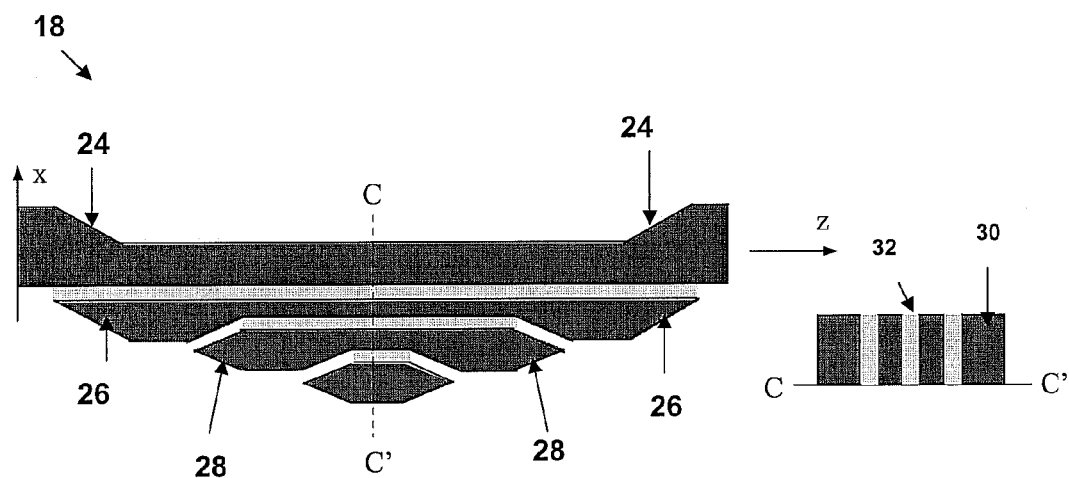
Figure 3:
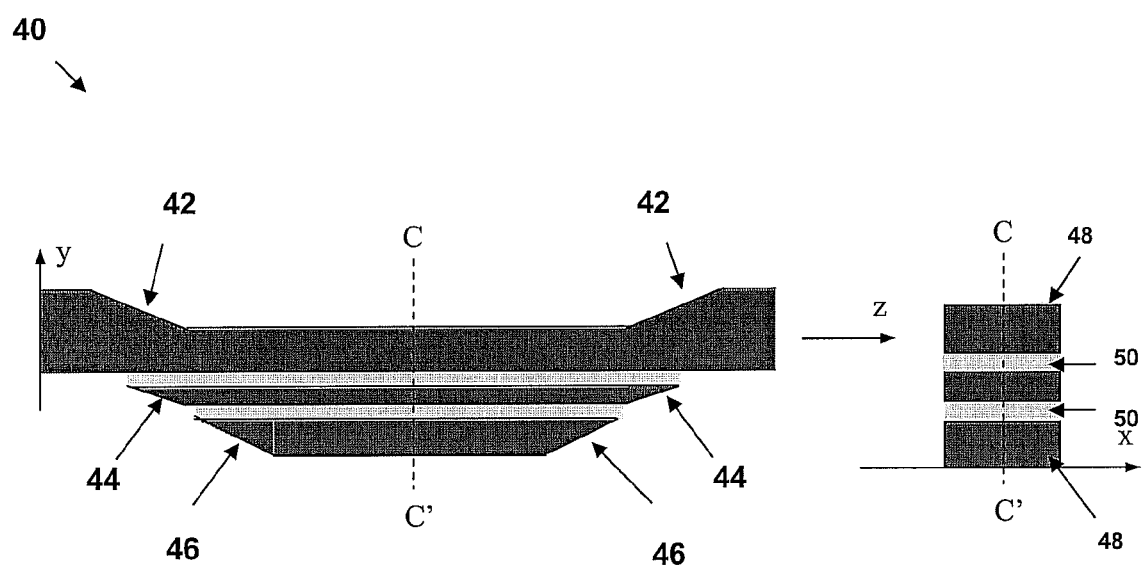
FIG. 3 is a schematic diagram of a high-index-contrast-strip-waveguide-to-horizontal-slots waveguide transformer with vertical complimentary taper pairs.

The configuration can be easily extended to multiple-slot waveguides. Two examples are illustrated in FIGS. 2A-2B for high-index-contrast-strip-waveguide-to-double/triple slot waveguide transformers 16, 18. In particular, FIG. 2A shows a double-slot transformer 16, and FIG. 2B shows a triple-slot transformer 18. Based on the configuration of single slot transformer, simply by adding more complimentary taper pairs 20, 22, 24, 26 with appropriate geometrical dimensions, the proposed approach can realized virtually high index contrast strip waveguide to arbitrary-number slot waveguide transformers with negligible transforming loss. The taper design for these transformers 16, 18 is similar to the single slot transformer. Note between each slot waveguide is the added low index contrast waveguide structures used for confinement. The C-C' cuts associated with FIGS. 2A and 2B show the cross section of the slot waveguide region of the transformers 16, 18 having multiple high index material layers 30 and low index material layers 32 used in defining the slot waveguides region of the transformers 16, 18.

The transformer configurations can also be extended to a horizontal slot waveguide transformer 40, where the waveguide cross-section involves multiple horizontal layers instead of vertical slots. As can be seen, several tapers 42, 44, 46 in vertical direction (y-direction) are involved. Although the fabrication process for this horizontal slot waveguide transformer is much more complicated that the vertical slot case, it is still possible to make the vertical tapers by special-etching processing. Note between each high index region 48 is the added low index regions structures 50 used for confinement as shown in the C-C' cut of the slot waveguide region of the horizontal slot waveguide transformer 40.

Figure 4:
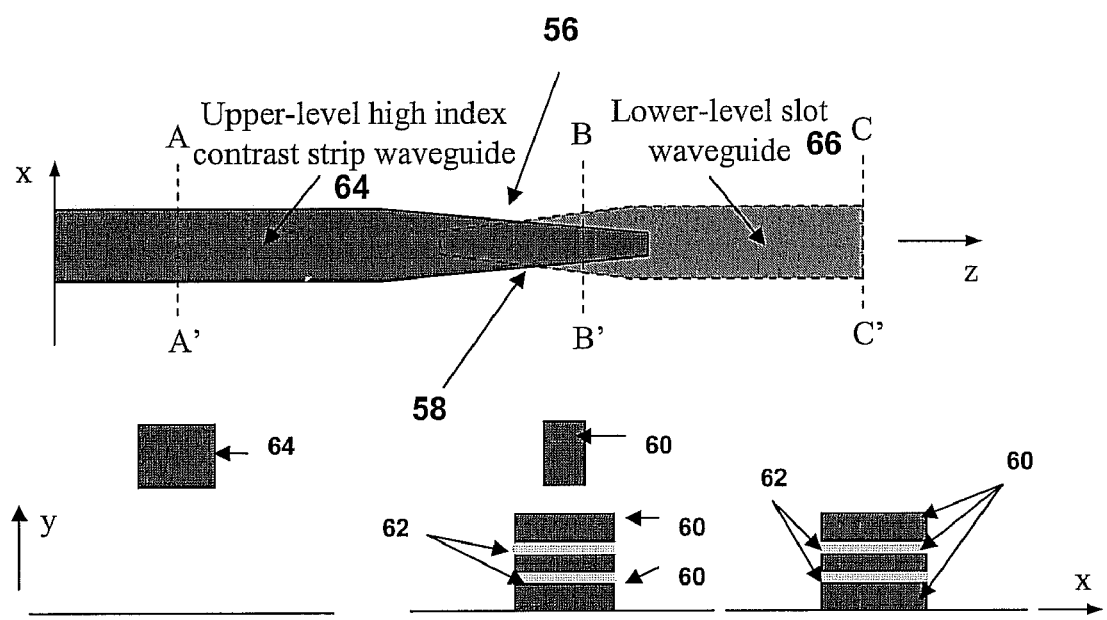
FIG. 4 is a schematic diagram of a high-index-contrast-strip-waveguide-to-horizontal-slot waveguide transformer with inverse taper pair.

The invention can also be used form a new configuration of the high-index-contrast-strip-waveguide-to-horizontal-slot-waveguide transformer 54 based on inverse taper pairs 56, 58. A schematic diagram of both top view and cross-sections of this transformer 54 is illustrated in FIG. 4. The structure 54 involves multiple high index material layers 60 separated by low index material layers 62 as shown in the B-B' and C-C' cuts. The top level defines the high index contrast strip waveguide 64 shown in the A-A' cut, and the lower level defines the multiple horizontal slot waveguide 66 show in the B-B' cut.

The effective indices of the high index contrast strip waveguide and slot waveguides are quite different. It makes the phase matching condition very difficult to satisfy for regular waveguide coupler configuration. The inventive transformer uses the vertical coupler with inverse taper configuration. By reducing the waveguide width of the high index contrast strip waveguide, more field will be squeezed out to the cladding region, which results in a decrease of the effective index of the waveguide. In the meantime, an inverse taper at low level of the structure with layered slots will gradually increase the width of the slot wave guide as shown in FIG. 4.

At certain waveguide widths, these two waveguides will eventually satisfy the phase matching condition and lead to very efficient coupling between them. Passing this point, there's no phase matching widths. Therefore, the power transforming is one way, for example, from high index contrast strip waveguide to slot waveguide if the light is launched from the high index contrast strip waveguide, and visa versa, until power transforming from one to the other waveguide completely. Again a careful design of taper length and shape is crucial for 100% power transforming.

In another approach to transform a vertical slot waveguide to an ARROW/PBG waveguide is provided. From ARROW/PBG waveguide, one can easily couple optical mode to optical fibers and realize the low loss coupling from optical fibers all the way to high index contrast strip waveguide via slot waveguide based mode transformers.

Figure 5:
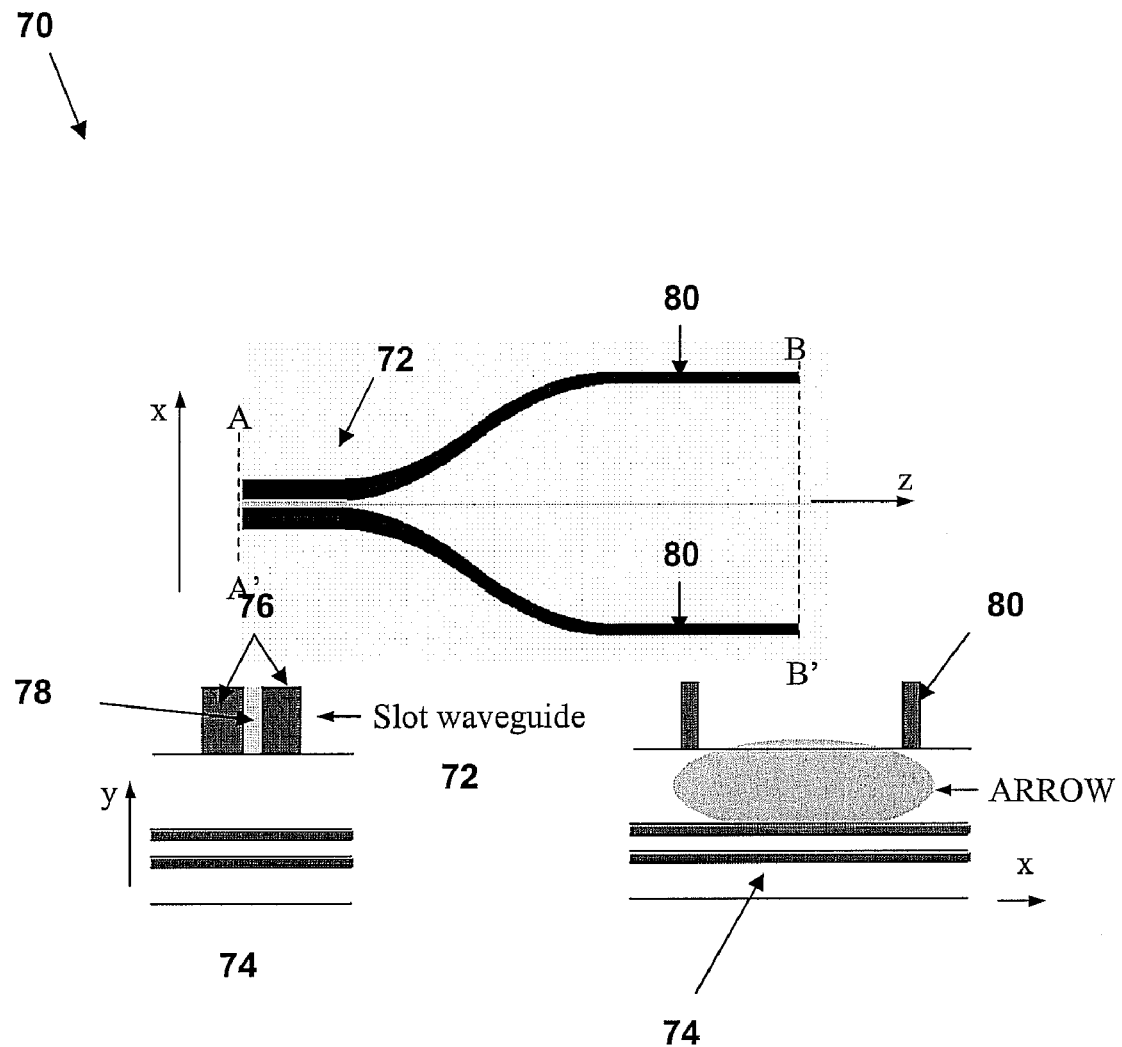
FIG. 5 is a schematic diagram of a single vertical slot waveguide to ARROW waveguide transformer.

FIG. 5 shows a schematic diagram of for a single slot to ARROW transformer 70. The structure 70 involves top level slot 72 and low level ARROW waveguide 74. The A-A' cut shows the cross section of the top level slot waveguide 72 and the cross section of the low level ARROW waveguide 74. The layer thicknesses of the high index media, as shown in the B-B' cut, in the ARROW waveguide 74 have to be the quarter wavelength to satisfy the anti-resonant condition. The A-A' cut shows the cross section of the slot waveguide having high index material layers 76 and a low index material layers 78. By gradually reducing the outside high-index waveguide 80 width of the slot wave guide 72 to the required quarter wavelength high-index reflecting walls in lateral direction, and simultaneously enlarging the slot region width, the field inside the slot waveguide 72 will slowly change to the mode pattern to the ARROW waveguide mode. A smoother taper shape with good taper design will certainly reduce the transforming loss significantly. Tapered S-bends are recommended in this configuration.

Figure 6:
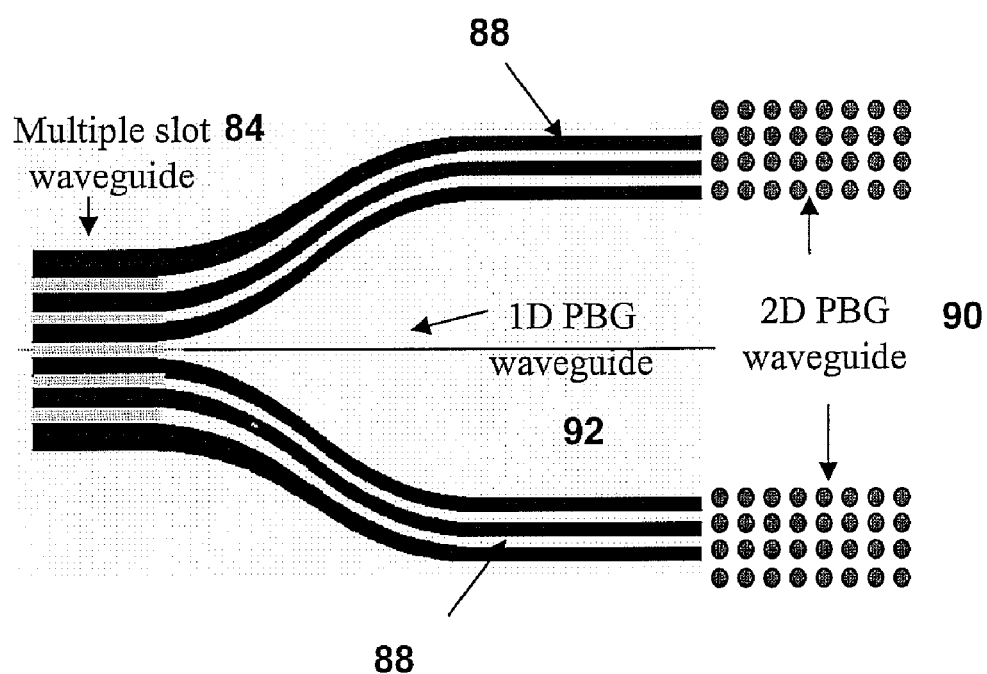
FIG. 6 is a schematic diagram of a multiple slot to 1D and 2D PBG waveguide transformer.

FIG. 6 shows a schematic diagram of a multiple-slot waveguide to 1D and 2D PBG waveguide transformer 84. This structure 84 involves a multiple-slot waveguide 86 with widths of slot region 86 and high-index material layers 88 to satisfy the condition of a 1D PBG waveguide 92 (quarter waveguide for each layer). By enlarging the central slot width to the desired width, it realizes a smoothly transforming from a multi-slot waveguide to PBG waveguide 92. From 1D PBG waveguide 92 to a two 2D PBG waveguides 90 is rather straightforward as shown in FIG. 6. The multiple-slot waveguide can be obtained by the approach described in FIG. 5.

Figure 7:
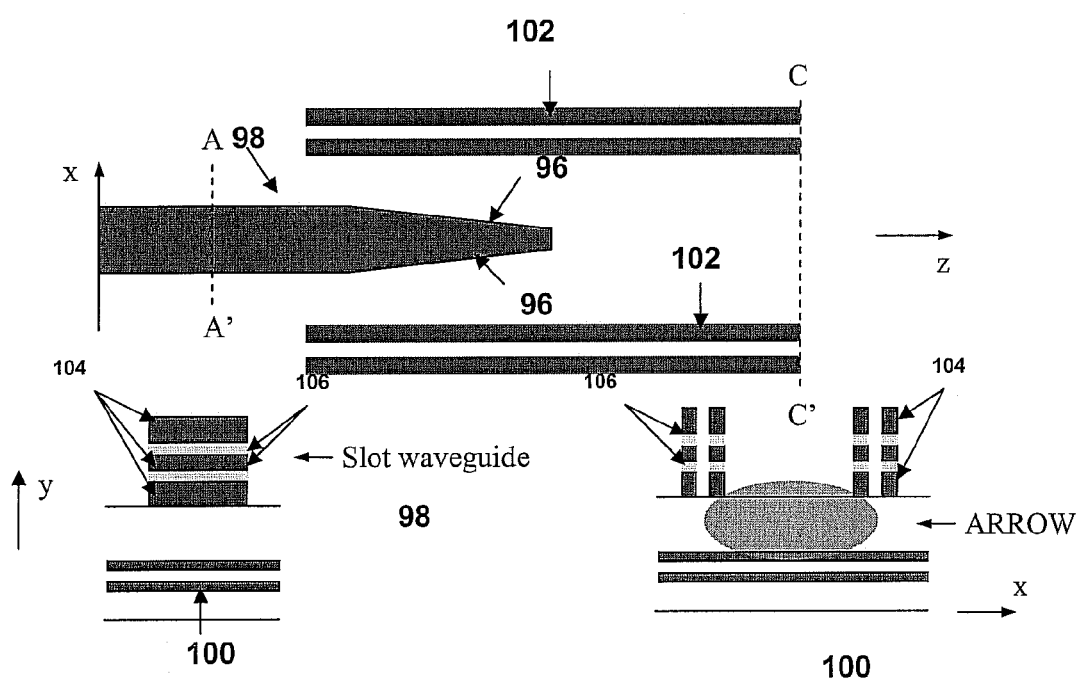
FIG. 7 is a schematic diagram of a multiple slot to 1D and 2D PBG waveguide transformer.

Horizontal slot to ARROW waveguide transformer 94 can utilize tapers 96 as shown in FIG. 7. The structure 94 involves two levels: the upper level is the multi-slot waveguide 98 as shown by the A-A' cut and the lower level is the ARROW waveguide 100. By introducing two quarter-wavelength-wide high-index reflecting walls 102 outside the slot waveguide taper 96, it will make a perfect horizontal slot to ARROW waveguide transformer 94. The C-C' cut shows the cross section of the two quarter-wavelength-wide high-index reflecting walls 102. The transformer 94 includes several buried thin high index material layers 104 as well as low index material layers 106 in order to provide the vertical confinement.

Figure 8:
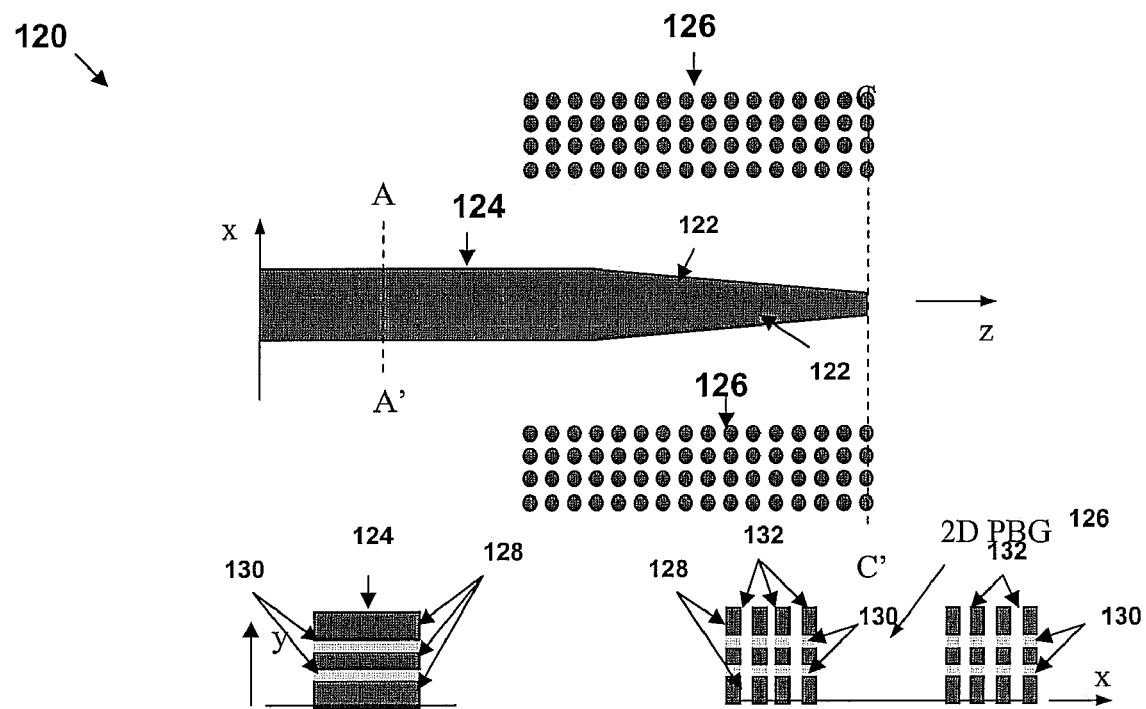
FIG. 8 is a schematic diagram of a horizontal-slot to 2D PBG waveguide transformer.

FIG. 8 shows a horizontal slot to ARROW waveguide transformer 120 that utilizes a taper 122 as well as two 2D PBG waveguides 126. The structure 120 involves a multi-slot waveguide 124 which is shown by the A-A' cut. By introducing two the 2D PBG waveguides 126 outside the slot waveguide taper 122, it will make a perfect horizontal slot to ARROW waveguide transformer 120. The C-C' cut shows the cross section of the two 2D PBG waveguides 126. The 2D PBG waveguides 126 includes a plurality of rods 132 and the C-C' having multiple buried thin high-index layers 128 in order to provide the vertical confinement as well as low index contrast material layers 130. The A-A' cut shows the cross section of the slot waveguide 124 also having multiple thin high index material layers 128 as well as low index material layers 130 in order to provide the vertical confinement.

Figure 9:
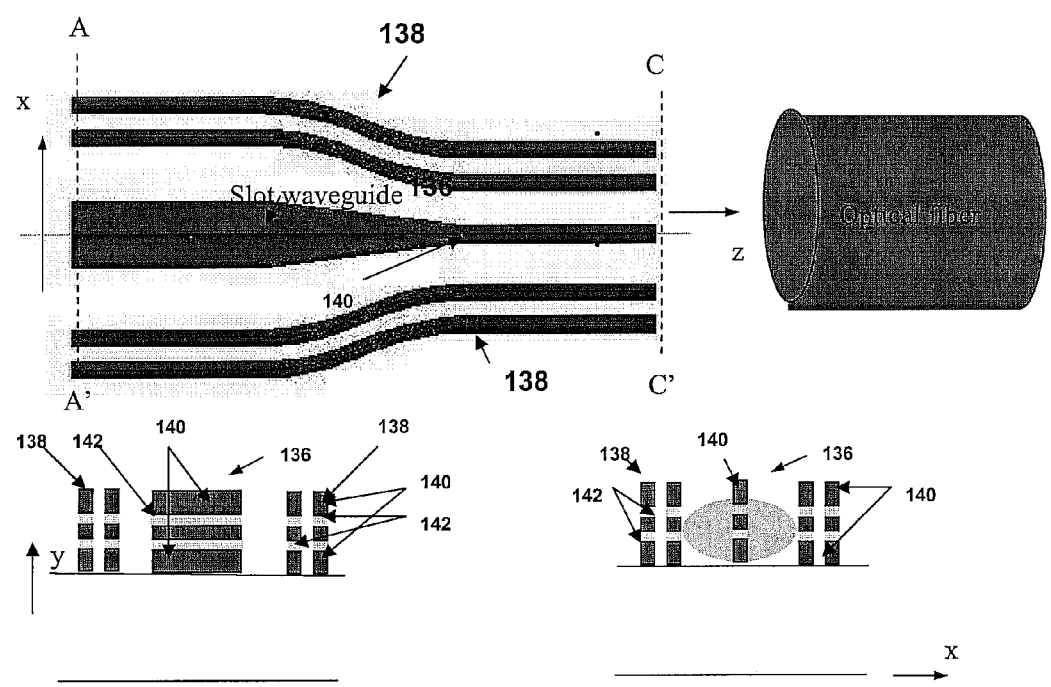
FIG. 9 is a schematic diagram of a simplified PBG-assisted optical fiber to single/multi-slot-waveguide coupler.

FIG. 9 shows another embodiment of the invention where two pairs of PBG-assisted optical fibers 138 are used to form a transformer 134. The transformer 134 includes a slot waveguide 136 having a tapered region 146 being extended to the end of the two pairs of PBG-assisted optical fibers 138. This structure 134 will allow fiber-to-slot waveguide coupling with very low loss as well as allowed mode matching with an optical fiber 144. The A-A' cut illustrates the cross-section of the slot waveguide 136 and the two pairs of PBG-assisted optical fibers 138 at the start, and the C-C' cut illustrates the cross-section of the slot waveguide 136 and the two pairs of PBG-assisted optical fibers 138 at the end. The slot waveguide 136 and the two pairs of PBG-assisted optical fibers 138 are comprised of high index material layers 140 and low index material 142 layers used for confinement.

The high index material layers used herein to form the various transformer structures can include materials such as silicon, doped silicon, germanium, doped germanium, silicon-germanium alloy, doped silicon-germanium alloy, III-V compound semiconductors, such as GaAs and InP, and doped III-V binary, ternary alloys. The low index material layers used herein can include polymers, silicon dioxide, doped silicon dioxide, silicon nitride, and air or the like.

The numerical ranges associated with the width and thicknesses the slot waveguides and any waveguides described herein are bounded by single mode conditions. For a given set of waveguide materials, dimension and configuration (single slot or multiply slot) of the low index slot region, the single mode condition determines the specific width and thickness of the high index waveguide regions. For example, for, the typical dimension for a single mode horizontal Si/SiO2 slot waveguide is ~50-60 nm SiO2 sandwiched by two 220 nm thick silicon region in the vertical direction (height); and 450-500 nm in the horizontal direction (width).

The index contrast of a slot waveguide is typically larger than 1 for the electric field to be significantly enhanced in low index slot region. For example, Si/SiO2 slot waveguides and Si3N4/air slot waveguides.

Although the present invention has been shown and described with respect to several preferred embodiments thereof, various changes, omissions and additions to the form and detail thereof, may be made therein, without departing from the spirit and scope of the invention.

What is claimed is:

1. A mode transforming structure comprising:
a first waveguide structure; and
one or more slot waveguide structures coupled to said first waveguide structure, said one or more slot waveguide structures includes at least one low index material layer positioned between one or more complementary high index tapered pairs so near lossless transforming between said first waveguide structure and said one or more slot waveguide structures occurs allowing optical modes to be transferred between said first waveguide and said one or more slot waveguide structures, one side of the one or more slot waveguide structures gradually tapers down to the width of at least one of the one or more complementary high index tapered pairs while another side of the one or more slot waveguide structures tapers up by gradually increasing to a specified width.

2. A method of forming a mode transforming structure comprising:
providing a first waveguide structure; and
forming one or more slot waveguide structures coupled to said first waveguide structure, said one or more slot waveguide structures includes at least one low index material layer positioned between one or more complementary high index tapered pairs so near lossless transforming between said first waveguide structure and said one or more slot waveguide structures occurs allowing optical modes to be transferred between said first waveguide and said one or more slot waveguide structures, one side of the one or more slot wave guide structures gradually tapers down to the width of at least one of the one or more complementary high index tapered pairs while another side of the one or more slot waveguide structures tapers up by gradually increasing to a specified width.

3. A method of performing mode transformation comprising:
  providing a first waveguide structure;
  coupling one or more slot waveguide structures to said first waveguide structure;
  arranging said one or more slot waveguide structures to have at least one low index material layer positioned between one or more complementary high index pair tapered pairs so near lossless transforming between said first waveguide structure and said one or more slot waveguide structures occurs allowing optical modes to be transferred between said first waveguide and said one or more slot waveguide structures, at the time of transforming, one side of the one or more slot waveguide structures gradually tapers down to the width of at least one of the one or more complementary high index tapered pairs while another side of the one or more slot wave guide structures tapers up by gradually increasing to a specified width.

* * * * *